July 6, 1926.
W. E. SIMPSON
FLEXIBLE COUPLING
Filed May 7, 1923
1,591,242
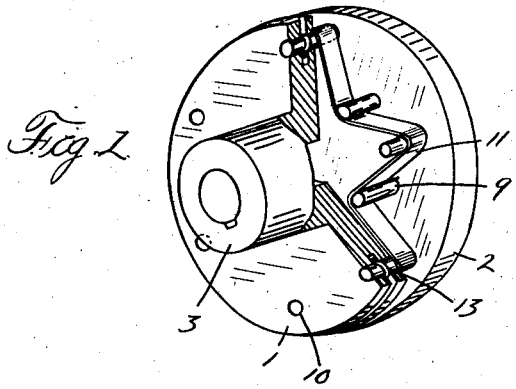
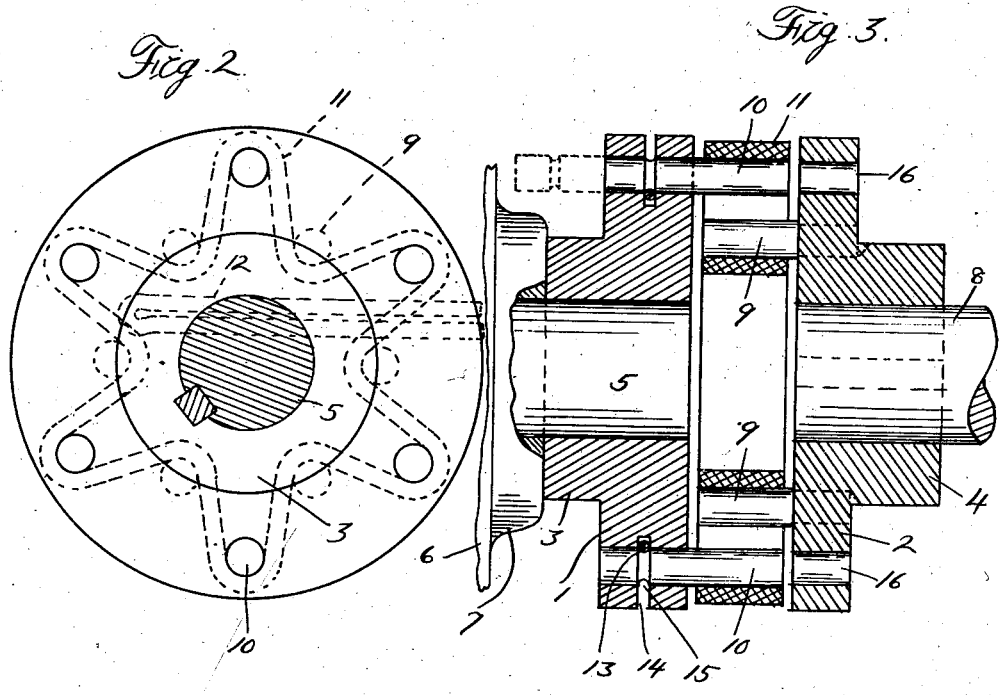
Inventor
William E. Simpson
By Whittemore Hulbert Whittemore
& Belknap    Attorneys Patented July 6, 1926.

1,591,242

UNITED STATES PATENT OFFICE.

WILLIAM E. SIMPSON, OF DETROIT, MICHIGAN, ASSIGNOR TO PALMER-BEE COMPANY, OF DETROIT, MICHIGAN, A CORPORATION OF MICHIGAN.

FLEXIBLE COUPLING.

Application filed May 7, 1923. Serial No. 637,355.

The invention relates to flexible couplings and has among its objects the provision of a coupling permitting of the driving and driven members being out of axial alignment as well as permitting movement of the driving and driven members toward each other or angularly relative to each other; the provision of a coupling in which vibration is eliminated; the provision of a coupling in which the load is distributed over both the driving and driven members; and the provision of a coupling having a flexible belt for effecting the driving of the driven member from the driving member, this belt being insertable into place without the necessity of separating the driving and driven members. Other objects of the invention reside in the novel features of construction and combinations and arrangements of parts as more fully hereinafter set forth.

In the drawings:

Figure 1 is a perspective view partly broken away of a flexible coupling embodying my invention;

Figure 2 is an end elevation thereof;

Figure 3 is a cross section therethrough.

1 and 2 are respectively the spaced driving and driven members of the flexible coupling in the form of disks having hubs 3 and 4 respectively. The driving member is keyed upon the drive shaft 5 which in the present instance is the drive shaft of the electric motor 6 having the nose 7 extending adjacent to the end of the hub 3. The driven member 2 is keyed upon the driven shaft 8.

For driving the driven member from the driving member I have provided the annular series of round pins 9 secured to the driven member 2 and extending transversely therefrom into the space between the driving and driven members. I have also provided the annular series of round pins 10 mounted upon the driving member 1 and adapted to extend into the space between the driving and driven members into positions overlapping the pins 9. The annular series of pins 9 are spaced radially inward from the annular series of pins 10. 11 is a flexible continuous member or belt which passes alternately over and under the pins 10 and 9 respectively, these pins being arranged in staggered annular relation.

With the construction as thus far described the driving of the driven member of the coupling from the driving member is efficiently accomplished regardless of the axial alignment or endwise movement of the shafts upon which these members are mounted. Furthermore, the arrangement is such that angular movement of the driving and driven members of the coupling is permitted. Owing to the extreme flexibility of the belt the vibrations caused by the eccentricity of the driving and driven shafts, endwise movement thereof, or the angular movement of the driving and driven members is substantially eliminated. Furthermore, the load upon the coupling is equally distributed over all of the pins of the coupling.

For the purpose of permitting of replacing or installing the flexible belt when the coupling is in place without the necessity of separating the coupling members, I have made the annular series of pins 10 longitudinally adjustably slidable in the driving member 1 beyond the hub 3 so that these pins may be adjusted from the space between the driving and driven members of the coupling, after which the flexible belt may be inserted in a flattened condition as shown by the dotted lines 12 in Figure 2 between the driving and driven members and looped radially outwardly to permit of the pins 10 being individually longitudinally moved into the space between the driving and driven members and into the loops to be embraced thereby.

For holding the longitudinally adjustable pins 10 in their operative positions I have provided the resilient split ring 13 occupying the annular grove 14 in the periphery of the driving member 1 and adapted to resiliently engage in the annular grooves 15 formed in the peripheries of the pins 10. This ring is located inside the pins 10 so that upon rotation of the coupling, the centrifugal force will press the ring into firmer engagement with the grooves in the pins. To permit of moving the pins sufficiently from the space between the driving and driven coupling members in the event that the hub 3 of the driving member is not long enough, the circumferential face of the nose 7 of the electric motor or similar prime mover terminates radially inward from the path of movement of the pins so that they can be moved to a position to overlap the nose. For moving the pins out of the space between the driving and driven coupling members the driven member 2 is provided with the annular series of openings 16 adapted to register with the pins 10 so that a drift may be inserted through these openings to engage the pins.

With this arrangement it will be readily seen that I have provided a simple construction of flexible coupling which in addition to having the advantages above pointed out is so arranged that the flexible belt may be inserted into place without the necessity of separating the driving and driven coupling members. Furthermore, in addition to saving the labor which will be required in separating the coupling members, a decided saving in time is made in inserting the belt. It will also be seen that the higher the rate of rotation of the coupling, the greater the force exerted upon the spring ring or retainer to hold the pins in operative position.

What I claim as my invention is:

1. In a flexible coupling, the combination with spaced cooperating driving and driven members, of transversely extending pins upon said members normally occupying the space therebetween, the pins of one of said members being longitudinally adjustable from the space between said members and provided with recesses in their peripheries, means engageable with said recesses for holding said pins in one position of adjustment, and a continuous flexible member passing over said pins when occupying the space between said members.

2. In a flexible coupling, the combination with spaced cooperating driving and driven members, of transversely extending pins upon said members normally occupying the space therebetween, the pins of one of said members being provided with annular grooves in their peripheries and being adjustable longitudinally from the space between said members, a resilient ring engageable in said grooves to hold said pins in the space between said members, and a flexible belt passing over said pins in the space between said members to effect the driving of said driven member from said driving member.

3. In a flexible coupling, the combination with spaced cooperating driving and driven members, of transversely extending pins upon said members normally occupying the space therebetween, the pins of one of said members being provided with recesses in their peripheries and being longitudinally adjustable from the space between said members, means positioned radially inward relative to said last-mentioned pins and engageable with the recesses thereof and a flexible member engaging all of said pins for effecting the driving of said driven member from said driving member.

4. In a flexible coupling, the combination with spaced cooperating driving and driven members each having a plurality of pins normally occupying the space between said members, of a continuous flexible member passing over the pins to form a series of loops, the pins of one of said members being individually adjustable longitudinally from the space between said members and a single means engaging said last mentioned member and pins for holding said last mentioned pins in one position of adjustment.

5. In a flexible coupling, the combination with spaced cooperating driving and driven members each having a plurality of pins normally occupying the space therebetween, one of said members being provided with a groove and the pins of said member being provided with annular grooves in their peripheries adapted to register with the first mentioned groove, said pins being longitudinally adjustable from the space between said members, a yieldable ring positioned within the first mentioned groove and radially inward relative to said last mentioned pins and engageable with the annular grooves therein and a flexible member engaging all of said pins for effecting the driving of said driven member from said driving member.

In testimony whereof I affix my signature.

WILLIAM E. SIMPSON.